UNITED STATES PATENT OFFICE 1,998,350

PROCESS FOR IMPROVING LUBRICATING OILS

Carl Wulff, Ludwigshafen-on-the-Rhine, Friedrich Moll, Mannheim, and Wilhelm Breuers, Ludwigshafen-on-the-Rhine, Germany, assignors to I. G. Farbenindustrie Aktiengesellschaft, Frankfort-on-the-Main, Germany No Drawing. Application August 17, 1931, Serial No. 557,728. In Germany August 26, 1930

8 Claims. (Cl. 87—9)

The present invention relates to improved lubricating oils and a process for improving lubricating oils.

We have found that the properties of lubricating oils are considerably improved in a simple manner by dissolving therein hydrocarbons having a high molecular weight of more than 800 and preferably of more than 2000 measured according to the viscosity method of Staudinger, and which are selected from those polymerization products of unsaturated hydrocarbons capable of forming polymeric homologous series, and those products obtainable therefrom by hydrogenation, by isomerization, and by isomerization and hydrogenation, which on heating to a temperature up to 200° C. for a period of 5 minutes, either alone or dissolved in a hydrocarbon oil do not undergo any appreciable decomposition. Polymeric homologous compounds according to the definition suggested by Staudinger in "Zeitschrift fur angewandte Chemie", vol. 42, (1929) page 69 are those which are formed by polymerization of the same elementary molecule and which are different from each other only by the degree of polymerization but which for the rest have the same molecular structure. Examples of suitable hydrocarbons of the said nature are polymerized styrene, hydrogenated polymerized styrene, polymerized indene, hydrogenated rubber or hydrogenated polymerized diolefines, such as hydrogenated polymerized butadiene or isoprene, or cyclo-rubber or hydrogenated cyclo-rubber (see Chemical Review, vol. 7, (1930), page 120. H. L. Fischer "The chemistry of rubber"). Hydrogenated polymerization products of diolefines and hydrogenated cyclo-rubber may be prepared by hydrogenating polymerization products of diolefines or cyclo rubber respectively under conditions similar to those employed in the hydrogenation of rubber. The upper limit of the amounts of the said additions added varies with the nature of the additions. Thus up to 30 per cent of hydrogenated rubber may be added with very good results. Hydrogenated polymerized styrenes of a certain degree of polymerization are added in an amount twice as large as polymerized styrenes of the same degree of polymerization for obtaining the same degree of viscosity. Additions of larger amounts usually lead to too high a viscosity for practical purposes. These upper limits are merely given as illustrative of the relative action of products of different degrees of polymerization. In cases where the degree of polymerization is less, higher limits may be employed, whereas with a greater degree of polymerization the amounts of the said products which can be added are less. The amounts of the said additions will in most cases exceed 0.5 and often exceed 1 per cent. The said hydrocarbons of high molecular weight are usually contained in the lubricating oils, improved in accordance with the present invention, in a colloidal state of solution. Thus, by adding 2 per cent of solid polymerized styrene (which may be prepared for example by polymerization while heating for several hours to 100° C. or by the polymerization at ordinary temperature of an emulsion of styrene with or without the employment of polymerization accelerators, such as hydrogen peroxide, benzoyl peroxide and the like) which itself has no lubricating oil character, to a lubricating oil having an absolute viscosity of 0.1, an oil is obtained having an absolute viscosity of about 0.5. The temperature-viscosity curve of this colloidal solution is flat and entirely equal to that of a fatty oil. This fact is the more surprising in view of the fact that hitherto a great variation of the viscosity with the temperature has always been found in the case of colloidal solutions.

The lubricating oils obtained are very stable to heat and air. For example the tarring number is not increased. Likewise no resinification or decomposition takes place when the oils are heated for long periods of time.

Instead of adding the said hydrocarbons of high molecular weight as such, simple polymerizable hydrocarbons as for example the monomeric hydrocarbons from which the said hydrocarbons of high molecular weight are derived, in particular styrene and indene may be added to the oils and then polymerized by heating, if desired with an addition of polymerization accelerators, the viscosity thus being increased. The polymerization of the said monomeric hydrocarbons while dissolved in lubricating oils is effected in a manner and under conditions quite similar to that employed for the known polymerization in other solvents, such as benzene or toluene. Where it is desirable to incorporate hydrogenated hydrocarbons of high molecular weight, for example when the final product shall be of a great resistance to elevated temperatures, for example 300° C., this may be carried out by adding hydrocarbons of high molecular weight, and then hydrogenating them. In case the initial lubricating oils contain sulphur it is preferable either to desulphurize them before the hydrogenation or to employ as hydrogenating catalyst those which are immune against sulphur poisoning. An alternative method of effecting this latter result is by adding to the lubricating oils the aforesaid polymerizable hydrocarbons, and polymerizing and hydrogenating the said polymerizable hydrocarbons simultaneously.

The following examples will further illustrate the nature of this invention but the invention is not restricted to these examples.

*Example 1*

1, 2 and 4.5 per cent of a polymerized styrene prepared by polymerization at 100° C. and 1 and 2 per cent of a polymerized styrene prepared by polymerizing an emulsion thereof are added to different portions of a lubricating oil prepared by the alkylation of naphthalene by means of lower olefines at elevated pressure and temperature. The following table illustrates the absolute viscosity ($\eta$) at various temperatures (given in degrees centigrade) of the said oil with and without the said additions:

|  | $\eta$ at 20° | $\eta$ at 40° | $\eta$ at 60° |
|---|---|---|---|
| Lubricating oil without addition | 0.116 | 0.055 | 0.032 |
| Lubricating oil with an addition of polymerized styrene |  |  |  |
| (a) polymerized while heating |  |  |  |
| 1 per cent | 0.192 | 0.091 | 0.053 |
| 2 per cent | 0.393 | 0.187 | 0.105 |
| 4.5 per cent | 1.160 | 0.514 | 0.280 |
| (b) polymerized in emulsion |  |  |  |
| 1 per cent | 0.217 | 0.103 | 0.060 |
| 2 per cent | 0.469 | 0.217 | 0.124 |

*Example 2*

4 per cent of hydrogenated polymerized styrene obtained by polymerization of styrene at 100° C. and subsequent hydrogenation are added to a commercial spindle oil. The following table shows the viscosity ($\eta$) of the oil with and without the addition at various temperatures (given in degrees centigrade):

|  | $\eta$ at 20° | $\eta$ at 40° | $\eta$ at 60° |
|---|---|---|---|
| Spindle oil without addition | 0.922 | 0.303 | 0.150 |
| Spindle oil with an addition of 4 per cent of hydrogenated polymerized styrene | 2.85 | 1.38 | 0.85 |

*Example 3*

100 parts by weight of a naphthenic lubricating oil and 3 parts of monomeric styrene are heated for 20 hours at 150° C. The viscosity of the oil is increased in a manner similar to that described in Example 1.

*Example 4*

Hydrogenated rubber (prepared by the catalytic hydrogenation of natural rubber dissolved in cyclohexane by means of a nickel catalyst until no further hydrogen is taken up) is added to spindle oil in amounts of 2 and 5 per cent. The influence of the addition on the viscosity $\eta$ of the spindle oil at different temperatures (given in degrees centigrade) is illustrated in the following table:

|  | $\eta$ at 40° | $\eta$ at 60° | $\eta$ at 80° |
|---|---|---|---|
| Spindle oil without addition | 0.142 | 0.068 | 0.039 |
| Spindle oil with an addition of hydrogenated rubber |  |  |  |
| 2 per cent | 0.332 | 0.153 | 0.095 |
| 5 per cent | 0.572 | 0.253 | 0.155 |

*Example 5*

A hydrogenated polymerization product of butadiene is added in amounts of 2 and 5 per cent to a synthetic naphthalene oil boiling between 300° and 350° C. obtained by the alkylation of naphthalene in the presence of aluminium chloride. The viscosity ($\eta$) of the oil with and without the additions at different temperatures (given in degrees centigrade) is shown in the following table:

|  | $\eta$ at 40° | $\eta$ at 60° | $\eta$ at 80° |
|---|---|---|---|
| Naphthalene oil without addition | 0.496 | 0.17 | 0.079 |
| Naphthalene oil with an addition of hydrogenated butadiene polymerization product |  |  |  |
| 2 per cent | 0.802 | 0.264 | 0.136 |
| 5 per cent | 1.47 | 0.50 | 0.258 |

*Example 6*

1 part of a hydrogenated polymerized styrene is dissolved at 60° C. in a commercial lubricating oil for gas machines. The influence of the addition on the viscosity determined, by Engler degrees, in a Vogel-Ossag apparatus is illustrated in the following table, in which the values in the columns designed by V. I. indicates the viscosity index as defined by E. W. Dean and G. H. B. Davis in "Chemical and Metallurgical Engineering, vol. 36, (1929)" pages 618 to 619:

|  | Degrees Engler at | | | V. I. |
|---|---|---|---|---|
|  | 38° C. | 50° C. | 98° C. |  |
| Lubricating oil without addition | 19.71 | 9.61 | 1.93 | 36 |
| Lubricating oil with an addition of 1 per cent of hydrogenated polymerized styrene | 22.26 | 10.42 | 2.10 | 60 |

When these products were heated for 3 minutes to 300° C. the corresponding values were:

|  | Degrees Engler at | | | V. I. |
|---|---|---|---|---|
|  | 38° C. | 50° C. | 98° C. |  |
| Lubricating oil without addition | 18.70 | 8.61 | 1.89 | 37 |
| Lubricating oil with an addition of 1 per cent of hydrogenated polymerized styrene | 22.28 | 10.78 | 2.18 | 73 |

*Example 7*

1 part of a hydrogenated rubber is dissolved at 60° C. in the same lubricating oil as employed according to Example 6. The influence of the addition on the viscosity determined, by Engler degrees, in a Vogel-Ossag apparatus is illustrated in the following table showing the properties of the thus improved lubricating oil:

| Degrees Engler at | | | V. I. |
|---|---|---|---|
| 38° C. | 50° C. | 98° C. |  |
| 31.07 | 15.88 | 2.56 | 83 |

When the said improved lubricating oil was heated for 3 minutes to 300° C. the corresponding values were:

| Degrees Engler at | | | V. I. |
|---|---|---|---|
| 38° C. | 50° C. | 98° C. |  |
| 29.18 | 13.47 | 2.32 | 60.5 |

What we claim is:

1. A composition of matter comprising a lubricating oil and an addition of at least 0.5 per cent by weight of polymerized styrene.

2. A composition of matter comprising a lubricating oil and an addition of at least 0.5 per cent by weight of hydrogenated rubber.

3. A composition of matter comprising a lubricating oil and an addition of at least 0.5 per cent by weight of a hydrogenated polymerized diolefine.

4. A composition of matter comprising a lubricating oil and an addition of at least .5 per cent by weight of a hydrocarbon having a molecular weight of more than 800 and which is selected from the group consisting of those polymerization products of unsaturated hydrocarbons capable of forming polymeric homologous series, and those products obtainable therefrom by hydrogenation, by isomerization, and by isomerization and hydrogenation, which are not appreciably decomposed when heated up to 200° C. for about five minutes.

5. A composition of matter comprising a lubricating oil and a viscosity-improving amount of a hydrocarbon soluble therein having a molecular weight of more than 800, and not being appreciably decomposed when heated up to 200° C. for about five minutes, and selected from the class consisting of polymerized hydrocarbons of a polymeric homologous series having an aliphatic or cycloaliphatic unsaturated group and the hydrogenation and isomerization products of such polymerized hydrocarbons.

6. A composition of matter comprising a lubricating oil and a viscosity-improving amount of a hydrocarbon soluble therein having a molecular weight of more than 800, not being appreciably decomposed when heated up to 200° C. for about five minutes and selected from the class consisting of polymerization products of unsaturated hydrocarbons capable of forming a polymeric homologous series, the hydrogenation products of said polymerization products, hydrogenated polymerized diolefines, hydrogenated rubber, cyclorubber and hydrogenated cyclorubber.

7. A composition of matter comprising a lubricating oil and at least .05 per cent by weight of a hydrogenated hydrocarbon polymer of a polymeric homologous series having a molecular weight of at least 800 and not being appreciably decomposed when heated up to 200° C. for about five minutes.

8. A composition as defined in claim 5 in which the hydrocarbon added to the lubricating oil in a viscosity improving amount is an aliphatic hydrocarbon.

CARL WULFF.
FRIEDRICH MOLL.
WILHELM BREUERS.